(12) United States Patent
Dejneka et al.

(10) Patent No.: US 10,047,000 B2
(45) Date of Patent: Aug. 14, 2018

(54) METHOD OF MAKING GLASS SHEETS WITH VEHICLE PRETREATMENT OF REFRACTORY

(71) Applicant: Corning Incorporated, Corning, NY (US)

(72) Inventors: Matthew John Dejneka, Corning, NY (US); Sinue Gomez, Corning, NY (US); Benjamin Zain Hanson, Big Flats, NY (US); James Robert Rustad, Germantown, MD (US); Susan Lee Schiefelbein, Ithaca, NY (US); Kochuparambil Deenamma Vergheese, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 50 days.

(21) Appl. No.: 15/111,682

(22) PCT Filed: Jan. 12, 2015

(86) PCT No.: PCT/US2015/010963
§ 371 (c)(1),
(2) Date: Jul. 14, 2016

(87) PCT Pub. No.: WO2015/108802
PCT Pub. Date: Jul. 23, 2015

(65) Prior Publication Data
US 2016/0340223 A1 Nov. 24, 2016

Related U.S. Application Data

(60) Provisional application No. 61/927,661, filed on Jan. 15, 2014.

(51) Int. Cl.
*C03B 17/06* (2006.01)
*C04B 41/00* (2006.01)
(Continued)

(52) U.S. Cl.
CPC .......... *C03B 17/064* (2013.01); *C04B 35/481* (2013.01); *C04B 41/0072* (2013.01);
(Continued)

(58) Field of Classification Search
CPC ........ C04B 2235/96; C04B 2235/3244; C04B 2235/3248; C04B 41/009; C04B 14/306;
(Continued)

(56) References Cited

U.S. PATENT DOCUMENTS 2,919,209 A * 12/1959 Bossard ................ C04B 41/009
165/185
3,215,555 A * 11/1965 Krey ........................ C03C 17/10
427/229

(Continued)

FOREIGN PATENT DOCUMENTS

DE 687997 C 2/1940
FR 2850891 A1 8/2004
(Continued)

OTHER PUBLICATIONS

F.G.K.Baucke and G.Roth, "Electrochemical Mechanism of the Oxygen Bubble Formation at the Interface Between Oxidic Melts and Zirconium Silicate Refractories," Glastech. Ber., vol. 61, No. 5, pp. 109-118, 1988.
(Continued)

*Primary Examiner* — Jodi C Franklin

(57) ABSTRACT

A method of making a glass sheet includes treating a refractory block material comprising at least one multivalent component with a vehicle comprising at least one redox altering component or precursor. The method also includes flowing molten glass over the refractory block material, wherein the treatment of the refractory block material with the vehicle comprising at least one redox altering component or precursor reduces the amount of oxygen production
(Continued)

resulting from interaction between the at least one multivalent component and the molten glass.

13 Claims, 3 Drawing Sheets

(51) Int. Cl.
*C04B 35/48* (2006.01)
*C04B 41/50* (2006.01)
*C04B 41/85* (2006.01)

(52) U.S. Cl.
CPC ........ *C04B 41/501* (2013.01); *C04B 41/5009* (2013.01); *C04B 41/5014* (2013.01); *C04B 41/5072* (2013.01); *C04B 41/85* (2013.01); *C04B 2235/6567* (2013.01)

(58) Field of Classification Search
CPC .. C04B 2235/9669; C03B 17/064; C03B 5/43
See application file for complete search history.

(56) References Cited

U.S. PATENT DOCUMENTS

| | | | | |
|---|---|---|---|---|
| 3,216,837 | A | * | 11/1965 | Mctaggart ............. C03C 14/004 501/106 |
| 3,245,830 | A | * | 4/1966 | Flexon ...................... C03B 5/43 264/30 |
| 3,451,798 | A | | 6/1969 | Simon |
| 3,537,834 | A | | 11/1970 | Simon |
| 3,748,157 | A | * | 7/1973 | Moore, Jr. ............. B22C 1/165 106/38.3 |
| 5,756,160 | A | * | 5/1998 | Pratt ................... C04B 41/5089 427/397.7 |
| 6,974,786 | B2 | | 12/2005 | Helfinstine et al. |
| 7,238,635 | B2 | | 7/2007 | Ames et al. |
| 7,409,839 | B2 | | 8/2008 | Boratav et al. |
| 8,028,544 | B2 | | 10/2011 | Mcintosh |
| 8,263,514 | B2 | | 9/2012 | Citti et al. |
| 8,746,010 | B2 | * | 6/2014 | Ellison .................... C03C 21/00 65/374.13 |
| 2002/0107133 | A1 | * | 8/2002 | Troczynski ............. C04B 28/34 501/1 |
| 2005/0127549 | A1 | * | 6/2005 | Bischoff ................. C04B 35/22 264/86 |
| 2005/0130830 | A1 | * | 6/2005 | Ames .................... C03B 17/064 501/103 |
| 2009/0188347 | A1 | * | 7/2009 | Taber .................... B82Y 30/00 75/301 |
| 2010/0012484 | A1 | * | 1/2010 | Citti ......................... C03B 5/43 204/242 |
| 2010/0212359 | A1 | * | 8/2010 | Godard ................. C03B 17/064 65/90 |
| 2013/0233019 | A1 | * | 9/2013 | Ellison .................... C03C 21/00 65/30.14 |
| 2014/0230490 | A1 | | 8/2014 | Ellison et al. |

FOREIGN PATENT DOCUMENTS

| | | | |
|---|---|---|---|
| GB | WO 9923050 A1 * | 5/1999 | ............... C03B 5/43 |
| WO | 1999023050 A1 | 5/1999 | |
| WO | 2010099278 A2 | 9/2010 | |
| WO | 2012062913 A1 | 5/2012 | |
| WO | 2015108802 A1 | 7/2015 | |

OTHER PUBLICATIONS

International Search Report and Written Opinion PCT/US2015/010951 dated Apr. 16, 2015.
International Search Report and Written Opinion PCT/US2015/010963 dated Apr. 16, 2015.
H.D.Schreiber, et al, "Compositional Dependence of Redox Equilibria in Sodium Silicate Glasses," Journal of Non-Crystalline Solids, 177, pp. 340-346, 1994.
M.P.Dickenson and P.C.Hess, "The Structural Role and Homogeneous Redox Equilibria of Iron in Peraluminous, Metalumiouns, and Peralkaline Silicate Melts," Contrib. Mineral. Petrol., 92, pp. 207-217, 1986.

* cited by examiner

METHOD OF MAKING GLASS SHEETS WITH VEHICLE PRETREATMENT OF REFRACTORY

CROSS-REFERENCE TO RELATED APPLICATIONS

This application claims the benefit of priority under 35 U.S.C. § 365 of International Patent Application Serial No. PCT/US15/10963 filed on Jan. 12, 2015 designating the United States of America which claims the benefit of priority to U.S. Provisional Application Ser. No. 61/927,661 filed on Jan. 15, 2014, the contents of which are relied upon and incorporated herein by reference in their entirety.

BACKGROUND

Field

The present specification generally relates to methods of glass manufacture and, more specifically, relates to methods of making refractory materials used in glass-forming processes using vehicle pretreatment.

Technical Background

In the manufacture of glass materials, such as glass sheets used in touch screen and other display applications, the glass materials may be formed into specific shapes using a variety of processes. One method for the manufacture of glass sheets involves fusion drawing molten glass over the sides of a forming device (or isopipe). This can enable the production of thin flat sheets having superior flatness and smoothness compared to glass sheets manufactured by other methods.

In the manufacture of glass sheets using the fusion process, a specially shaped refractory block can be used as the forming device (or isopipe). An exemplary refractory block material comprises predominantly zircon ($ZrSiO_4$) that has been pressed and sintered according to predetermined specifications applicable for the specific forming process at hand.

In certain forming processes involving alkali-containing glasses, contact between the molten glass and new zircon-containing isopipe can result in the formation of undesirable oxygen blisters near the glass-refractory interface. One solution to this problem is to add antimony oxide to the glass material to absorb the oxygen and mitigate blister formation. However, demand is increasing for glasses containing antimony below the levels required for sufficient oxygen blister mitigation.

Accordingly, alternative methods are needed for mitigation of oxygen blister formation.

SUMMARY

According to one embodiment, a method of making a glass sheet includes treating a refractory block material that includes at least one multivalent component with a vehicle that includes at least one redox altering component or precursor. The method also includes flowing molten glass over the refractory block material, wherein the treatment of the refractory block material with the vehicle that includes at least one redox altering component or precursor reduces the amount of oxygen production resulting from interaction between the at least one multivalent component and the molten glass.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
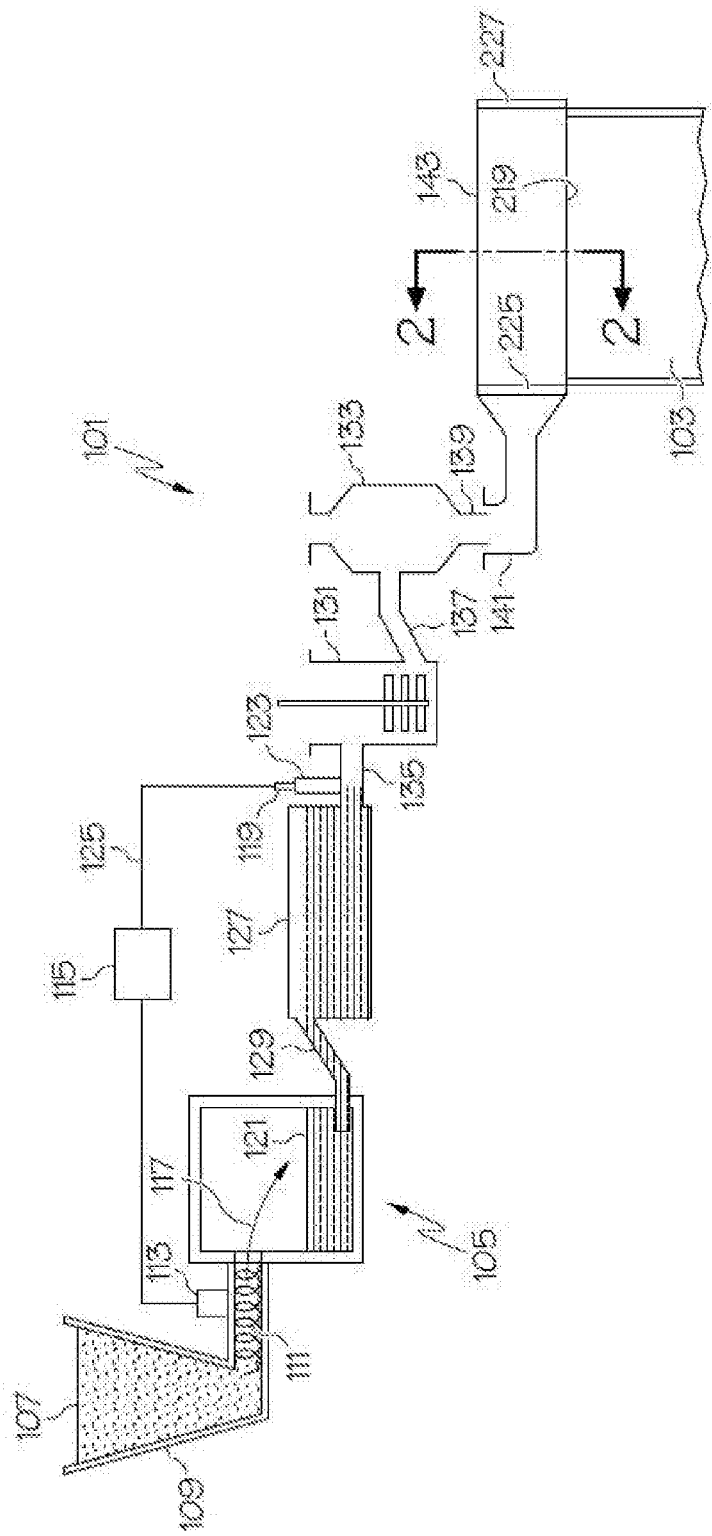
FIG. 1 is a schematic view of a glass forming apparatus including a forming device in accordance with aspects of the disclosure.

Reference will now be made in detail to various embodiments for use in the manufacture of glass sheets and glass manufacturing processes incorporating the same. Whenever possible, the same reference numerals will be used throughout the drawings to refer to the same or like parts.

As used herein, the term "glass sheet" refers to a rigid or flexible glass material having a length, width, and thickness, wherein the thickness can be, for example, less than 1 centimeter, such as less than 5 millimeters, and further such as less than 1 millimeter, and yet further such as less than 500 microns, and still yet further such as less than 300 microns, and even still yet further such as less than 100 microns, such as from 50 microns to 1 centimeter, and further such as from 100 microns to 1 millimeter.

As used herein, the term "redox altering component or precursor" refers to a component or precursor to a component that shifts the redox (oxidation-reduction) characteristic of at least one multivalent component such that the at least one multivalent component is reduced to a greater degree than it would be in the absence of the redox alternating component or precursor. For example, if the multivalent component comprises a metal oxide having a 3+ metal ion in the more oxidized state (e.g., $Fe_2O_3$) and a 2+ metal ion in the more reduced state (e.g., FeO), substantially reducing the metal oxide would result in the 2+ metal ion component/3+ metal ion component ratio (e.g., $XFeO/XFe_2O_3$) being at least twice what that ratio was prior to treatment with a vehicle comprising a redox altering component, such as at least 3 times what that ratio was prior to treatment with a vehicle comprising a redox altering component, such as at least 5 times what that ratio was prior to treatment with a vehicle comprising a redox altering component, such as at least 10 times what that ratio was prior to treatment with a vehicle comprising a redox altering component, such as at least 20 times what that ratio was prior to treatment with a vehicle comprising a redox altering component, including from 2 to 1,000 times what that ratio was prior to treatment with a vehicle comprising a redox altering component, such as from 5 to 500 times what that ratio was prior to treatment with a vehicle comprising a redox altering component, further such as from 10 to 100 times what that ratio was prior to treatment with a vehicle comprising a redox altering component, and yet further such as from 20 to 50 times what that ratio was prior to treatment with a vehicle comprising a redox altering component. The redox altering component can, for example, be a metal oxide with lower vapor pressure and diffusivity than an alkali metal oxide and the redox altering precursor can be, for example, a salt that can be transformed to an oxide by heating in air.

As used herein, the term "grain boundary phase" refers to a material that is contained or dispersed within the refractory block material. The grain boundary phase can, for example, comprise at least 1 wt %, such as at least 2 wt %, and further such as at least 5 wt %, and yet further such as at least 10 wt %, including from 1 wt % to 20 wt %, and from 2 wt % to 10 wt % of the total weight of the refractory block material that comprises the grain boundary phase.

FIG. 1 illustrates a schematic view of a glass forming apparatus 101 for fusion drawing a glass ribbon 103 for subsequent processing into glass sheets. The illustrated glass forming apparatus comprises a fusion draw apparatus although other fusion forming apparatus may be provided in further examples. The glass forming apparatus 101 can include a melting vessel (or melting furnace) 105 configured to receive batch material 107 from a storage bin 109. The batch material 107 can be introduced by a batch delivery device 111 powered by a motor 113. An optional controller 115 can be configured to activate the motor 113 to introduce a desired amount of batch material 107 into the melting vessel 105, as indicated by an arrow 117. A glass level probe 119 can be used to measure a glass melt (or molten glass) 121 level within a standpipe 123 and communicate the measured information to the controller 115 by way of a communication line 125.

The glass forming apparatus 101 can also include a fining vessel 127, such as a fining tube, located downstream from the melting vessel 105 and fluidly coupled to the melting vessel 105 by way of a first connecting tube 129. A mixing vessel 131, such as a stir chamber, can also be located downstream from the fining vessel 127 and a delivery vessel 133, such as a bowl, may be located downstream from the mixing vessel 131. As shown, a second connecting tube 135 can couple the fining vessel 127 to the mixing vessel 131 and a third connecting tube 137 can couple the mixing vessel 131 to the delivery vessel 133. As further illustrated, a downcomer 139 can be positioned to deliver glass melt 121 from the delivery vessel 133 to an inlet 141 of a forming device 143. As shown, the melting vessel 105, fining vessel 127, mixing vessel 131, delivery vessel 133, and forming device 143 are examples of glass melt stations that may be located in series along the glass forming apparatus 101.

The melting vessel 105 is typically made from a refractory material, such as refractory (e.g. ceramic) brick. The glass forming apparatus 101 may further include components that are typically made from platinum or platinum-containing metals such as platinum-rhodium, platinum-iridium and combinations thereof, but which may also comprise refractory metals such as molybdenum, palladium, rhenium, tantalum, titanium, tungsten, ruthenium, osmium, zirconium, and alloys thereof and/or zirconium dioxide. The platinum-containing components can include one or more of the first connecting tube 129, the fining vessel 127 (e.g., finer tube), the second connecting tube 135, the standpipe 123, the mixing vessel 131 (e.g., a stir chamber), the third connecting tube 137, the delivery vessel 133 (e.g., a bowl), the downcomer 139 and the inlet 141. The forming device 143 is made from a ceramic material, such as the refractory, and is designed to form the glass ribbon 103.

Figure 2:
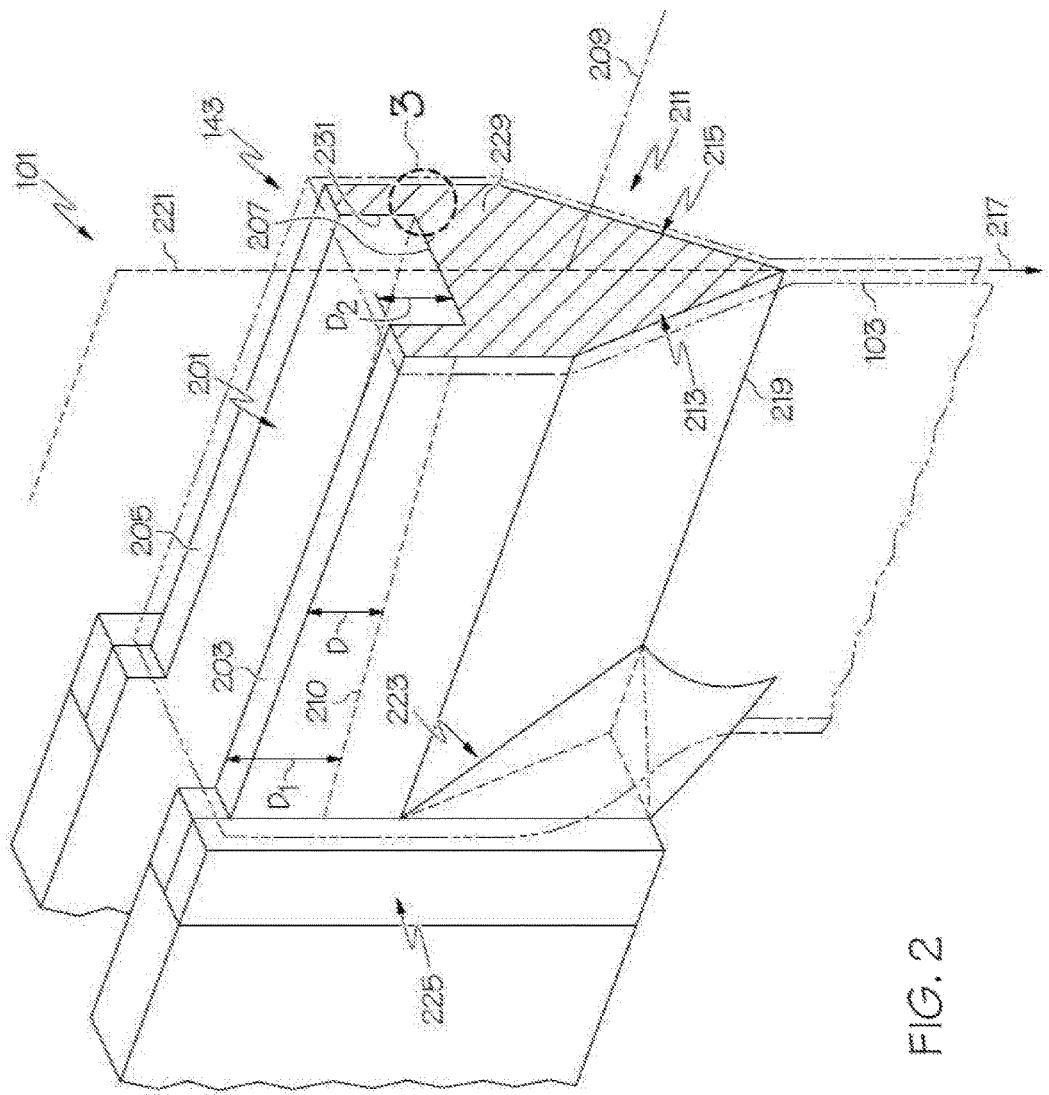
FIG. 2 is a cross-sectional enlarged perspective view of the forming device of FIG. 1.

FIG. 2 is a cross-sectional perspective view of the glass forming apparatus 101 along line 2-2 of FIG. 1. As shown, the forming device 143 can include a trough 201 at least partially defined by a pair of weirs comprising a first weir 203 and a second weir 205 defining opposite sides of the trough 201. As further shown, the trough may also be at least partially defined by a bottom wall 207. As shown, the inner surfaces of the weirs 203, 205 and the bottom wall 207 define a substantially U shape that may be provided with round corners. In further examples, the U shape may have surfaces substantially 90° relative to one another. In still further examples, the trough may have a bottom surface defined by an intersection of the inner surfaces of the weirs 203, 205. For example, the trough may have a V-shaped profile. Although not shown, the trough can include further configurations in additional examples.

As shown, the trough 201 can have a depth "D" between a top of the weir and a lower portion of the trough 201 that varies along an axis 209 although the depth may be substantially the same along the axis 209. Varying the depth "D" of the trough 201 may facilitate consistency in glass ribbon thickness across the width of the glass ribbon 103. In just one example, as shown in FIG. 2, the depth "$D_1$" near the inlet of the forming device 143 can be greater than the depth "$D_2$" of the trough 201 at a location downstream from the inlet of the trough 201. As demonstrated by the dashed line 210, the bottom wall 207 may extend at an acute angle relative to the axis 209 to provide a substantially continuous reduction in depth along a length of the forming device 143 from the inlet end to the opposite end.

The forming device 143 further includes a forming wedge 211 comprising a pair of downwardly inclined forming surface portions 213, 215 extending between opposed ends of the forming wedge 211. The pair of downwardly inclined forming surface portions 213, 215 converge along a downstream direction 217 to form a root 219. A draw plane 221 extends through the root 219 wherein the glass ribbon 103 may be drawn in the downstream direction 217 along the draw plane 221. As shown, the draw plane 221 can bisect the root 219 although the draw plane 221 may extend at other orientations with respect to the root 219.

The forming device 143 may optionally be provided with one or more edge directors 223 intersecting with at least one of the pair of downwardly inclined forming surface portions 213, 215. In further examples, the one or more edge directors can intersect with both downwardly inclined forming surface portions 213, 215. In further examples, an edge director can be positioned at each of the opposed ends of the forming wedge 211 wherein an edge of the glass ribbon 103 is formed by molten glass flowing off the edge director. For instance, as shown in FIG. 2, the edge director 223 can be positioned at a first opposed end 225 and a second identical edge director (not shown in FIG. 2) can be positioned at a second opposed end (see 227 in FIG. 1). Each edge director 223 can be configured to intersect with both of the downwardly inclined forming surface portions 213, 215. Each edge director 223 can be substantially identical to one another although the edge directors may have different characteristics in further examples. Various forming wedge and edge director configurations may be used in accordance with aspects of the present disclosure. For example, aspects of the present disclosure may be used with forming wedges and edge director configurations disclosed in U.S. Pat. No. 3,451,798, U.S. Pat. No. 3,537,834, U.S. Pat. No. 7,409,839 and/or U.S. Provisional Pat. Application No. 61/155,669, filed Feb. 26, 2009 that are each herein incorporated by reference in its entirety.

Figure 3:
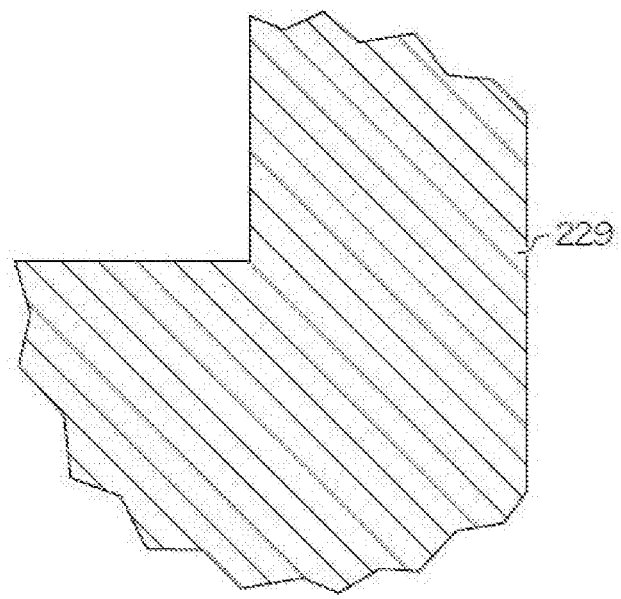
FIG. 3 is an enlarged view of the forming device of FIG. 2 according to one embodiment of the disclosure.
Figure 4:
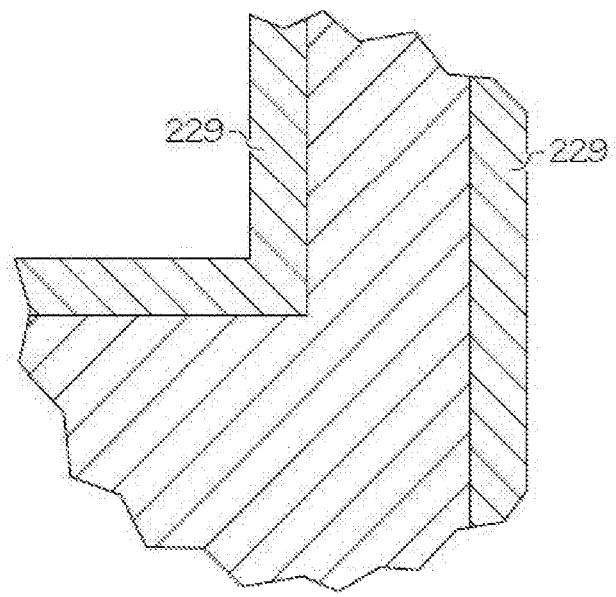
FIG. 4 is an enlarged view of the forming device of FIG. 2 according to another embodiment of the disclosure.

FIG. 3 is an exaggerated sectional perspective view of 3 of the forming device 143 of FIG. 2. As illustrated, the entire body of the forming device 143 can comprise the refractory 229. In another instance illustrated in FIG. 4, the forming device 143 can comprise the refractory 229 that is formed as an outer layer on the exterior of the forming device 143 such that the molten glass contacts only the refractory. For instance, the refractory 229 with a predetermined thickness can be formed on the outer side of the forming device 143.

The refractory material can, in certain exemplary embodiments, comprise a wide range of ceramic compositions that have material properties that are suitable for fusion drawing molten glass into a glass ribbon. Typical material characteristics of the refractory material in the forming device can comprise resistance to high temperatures without contaminating the molten glass, strength, the ability to avoid creep, resistance to wear and/or other features. For example, the refractory block material may comprise at least one component material selected from the group consisting of zircon, alumina, titania, mullite, monazite, xenotime, spinel, zirconia, beta-alumina, and beta double prime-alumina.

In a particularly preferred embodiment, the refractory block material comprises zircon ($ZrSiO_4$). For example, the refractory block material may comprise at least 50% zircon by weight, such as at least 75% zircon by weight, including at least 80% zircon by weight, further including at least 95% zircon by weight, such as at least 98% zircon by weight, including at least 99% zircon by weight. For example, the refractory block material may consist essentially of zircon. The refractory block material may comprise minor components, such as 0.2% to 0.4% titania ($TiO_2$) by weight, as disclosed in U.S. Pat. No. 6,974,786, the entire disclosure of which is incorporated herein by reference. Minor components can also include the combination of $ZrO_2$, $TiO_2$, and $Fe_2O_3$, as disclosed in U.S. Pat. No. 7,238,635, the entire disclosure of which is incorporated herein by reference.

The refractory block material may also comprise at least one grain boundary phase that can result from at least one grain boundary phase precursor material being added to the refractory material prior to the refractory material being pressed (e.g., isopressed) and then fired into a forming device. Subsequent to firing, a refractory block material that comprises at least one grain boundary phase may be porous or nonporous, and when porous, may comprise open and/or closed pores. For example, in at least one embodiment, the refractory block material may be regarded as a generally porous material wherein the grain boundary phase forms a relatively thin glassy layer on at least a portion of the surface of the pores.

During firing, the grain boundary phase may change such that the composition comprises components that were not initially present in the grain boundary phase as the result of, for example, assimilation of tramp components during firing. For example, a grain boundary phase that primarily comprises $SiO_2$, $Na_2O$, and $ZrO_2$, prior to firing may, subsequent to firing, additionally comprise other components, such as $Al_2O_3$, $TiO_2$, $Fe_2O_3$, $CaO$, $K_2O$, and $MgO$. These assimilated components can, upon contact with certain molten glass compositions result in the undesirable formation of oxygen blisters near the glass-refractory interface.

For example, when molten glass flows over the surface of a forming device comprising a refractory block material that comprises open pores and at least one grain boundary phase, the molten glass can infiltrate the pores of the refractory and interact with the grain boundary phase that is present on at least a portion of the surface of the pores. Depending on the composition of the grain boundary phase and the composition of the molten glass, this can result in the facilitation of reactions that result in oxygen formation that can, in turn, result in blistering.

For example, when certain alkali-containing molten glasses mix with certain grain boundary phases wherein iron oxides are present, the following (reversible) redox reaction can liberate oxygen:

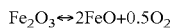

$$Fe_2O_3 \leftrightarrow 2FeO + 0.5O_2$$

Examples of alkali-containing molten glasses include glasses comprising $Na_2O$, including glasses comprising in weight percent on an oxide basis: (i) $50 \leq SiO_2 \leq 65\%$; (ii) $10 \leq Al_2O_3 \leq 20\%$; (iii) $0 \leq MgO \leq 5\%$; (iv) $10 \leq Na_2O \leq 20\%$; (iv) $0 \leq K_2O \leq 5\%$; and (v) $\geq 0$ and $\leq 1\%$ of at least one of $B_2O_3$, $CaO$, $ZrO_2$ and $Fe_2O_3$. Alkali-containing glasses, can for example, include alkali aluminosilicate glasses, such as Gorilla® Glass available from Corning Incorporated.

Whether the above reaction is driven to the left or the right is dependent on factors such as temperature, redox ratio of Fe ($XFeO/XFe_2O_3$), other system constituents that modify the reactive environment (e.g., cause a buffering effect, etc.), and whether the system constituents exist in an oxidizing or reducing environment.

Accordingly, embodiments disclosed herein include a step of first treating a refractory block material comprising at least one multivalent component with a vehicle comprising at least one redox altering component or precursor. Then, a step of flowing molten glass over the refractory block material, wherein the treatment of the refractory block material with the vehicle comprising at least one redox altering component or precursor reduces the amount of oxygen production resulting from interaction between the at least one multivalent component and the molten glass.

In certain exemplary embodiments, the at least one multivalent component comprises iron oxide.

The step of treating a refractory block material comprising at least one multivalent component with a vehicle comprising at least one redox altering component or precursor can include applying the vehicle to the surface of the refractory block material via at least one application method selected from the group consisting of spraying, brushing, rolling, dipping, and immersing. Such application method can be performed in at least one iteration, including multiple iterations of the same or different application methods.

The vehicle comprising the redox altering component or precursor may, in some embodiments, be a solution comprising the redox altering component, such as an aqueous (water) based solution. The solution may also comprise at least one component selected from the group consisting of alcohols, surfactants, hydrophilic binders, and hydrophobic binders.

The vehicle comprising the redox altering component or precursor may, in some embodiments, comprise a colloidal suspension that comprises at least one redox altering component. The colloidal suspension may also comprise at least one component selected from the group consisting of water, alcohols, surfactants, hydrophilic binders, and hydrophobic binders.

The vehicle comprising the redox altering component or precursor may, in some embodiments, comprise a sol that comprises at least one redox altering component. The sol may also comprise at least one component selected from the group consisting of water, alcohols, surfactants, hydrophilic binders, and hydrophobic binders.

When the vehicle comprising the redox altering component comprises a sol, the treating step can further comprise applying a pH modifying solution to precipitate the sol to a gel.

The vehicle comprising the redox altering component or precursor may, in some embodiments, comprise a paste, powder, or slurry.

During the treating step, the vehicle comprising at least one redox altering component or precursor can, for example, be a liquid that is applied in an amount of at least 50 microliters, such as at least 100 microliters, and further such as at least 200 microliters, and yet further such as at least 500 microliters, and still yet further such as at least 1 milliliter of liquid per square inch of surface space of the refractory block material, such as from 50 microliters to 50 milliliters of liquid, including from 100 microliters to 10 milliliters, and further including from 500 microliters to 5 milliliters of liquid per square inch of the refractory block material.

The concentration of the at least one redox altering component in the vehicle can vary depending on a number of factors, including the solubility limit of the at least one redox altering component in the vehicle. In that regard, the vehicle may be a liquid that is unsaturated or saturated with the at least one redox altering component. For example, the at least one redox altering component may be present in the liquid in a concentration ranging from 1% to 100%, such as from 5% to 50%, and further such as 10% to 30% of its solubility limit in that liquid at a given temperature (such as its solubility limit at a temperature of about 25° C.).

The concentration of the at least one redox altering component or precursor in the vehicle can also be quantified on a basis of mass of redox altering component per unit volume of vehicle. For example, in certain embodiments wherein the vehicle is a liquid, at least 1 gram, such as at least 2 grams, and further such as at least 5 grams, and yet further such as at least 10 grams, and still yet further such as at least 20 grams of redox altering component may be present per every 100 milliliters of liquid, such as from 1 gram to 100 grams of redox altering component, including from 5 grams to 50 grams of redox altering component, and further including from 10 grams to 20 grams of redox altering component per every 100 milliliters of liquid.

Following application of the at least one redox altering component or precursor, the treated refractory block material can be dried by at least one of any number of methods including hot air or convection drying at, for example, temperatures in the range of from 50° C. to 500° C., such as from 75° C. to 250° C., including about 100° C. and at times ranging from, for example, about 1 hour to 100 hours, such as from about 5 hours to 50 hours. The dried refractory block material can then be fired at a time and temperature that is adequate to convert the applied redox altering precursors to redox altering components (e.g., oxides) and optionally assimilate these components into a grain boundary phase of the refractory block material, thereby modifying the grain boundary phase. For example, the dried refractory block material can be fired at a temperature of at least 1000° C., such as from 1000° C. to 2000° C., for a time of at least 10 hours, such as from 10 hours to 250 hours, including from 20 hours to 150 hours.

In certain exemplary embodiments, the vehicle comprising at least one redox altering component or precursor comprises at least one alkaline earth compound. The at least one alkaline earth compound can, for example, be selected from the group consisting of alkaline earth carbonates, nitrates, nitrites, sulfates, hydrates, borates, oxides, fluorides, chlorides, bromides, iodides, sulfides, selenates, arsenates, antimonates, stannates, aluminates, phosphates, silicates, silicofluorides, thiocyanates, permanganates, perchlorates, and persulfates.

In certain exemplary embodiments, the at least one redox altering component is an alkaline earth oxide and the at least one redox altering precursor is an alkaline earth compound selected from the group consisting of alkaline earth carbonates, nitrates, nitrites, sulfates, hydrates, borates, fluorides, chlorides, bromides, iodides, sulfides, selenates, arsenates, antimonates, stannates, aluminates, phosphates, silicates, silicofluorides, thiocyanates, permanganates, perchlorates, and persulfates.

In certain exemplary embodiments, the vehicle comprising at least one redox altering component or precursor comprises less than 1 gram per 100 milliliters of alkali metal compounds, including less than 1 gram per 100 milliliters of alkali metal carbonates, nitrates, nitrites, sulfates, hydrates, borates, oxides, fluorides, chlorides, bromides, iodides, sulfides, selenates, arsenates, antimonates, stannates, aluminates, phosphates, silicates, silicofluorides, thiocyanates, permanganates, perchlorates, and persulfates.

In certain exemplary embodiments, the vehicle comprising at least one redox altering component or precursor is essentially free of alkali metal compounds, including being essentially free of alkali metal carbonates, nitrates, nitrites, sulfates, hydrates, borates, oxides, fluorides, chlorides, bromides, iodides, sulfides, selenates, arsenates, antimonates, stannates, aluminates, phosphates, silicates, silicofluorides, thiocyanates, permanganates, perchlorates, and persulfates.

In certain exemplary embodiments, the at least one redox altering component or precursor is selected from the group consisting of calcium chloride, magnesium chloride, strontium chloride, barium chloride, calcium carbonate, magnesium carbonate, strontium carbonate, barium carbonate, calcium oxide, magnesium oxide, strontium oxide, barium oxide, calcium nitrate, magnesium nitrate, strontium nitrate, barium nitrate, calcium sulfate, magnesium sulfate, strontium sulfate, and barium sulfate.

It has been found that embodiments herein provide improvements over methods taught elsewhere, such as in U.S. Pat. No. 2,919,209. Specifically, it has been found that, when at least one multivalent component, such as iron oxide, is present in a refractory block material, treatment of the refractory block material with alkali metal compounds disclosed in U.S. Pat. No. 2,919,209, particularly $Na_2CO_3$, under normal operating conditions (e.g., heat up times of at least two days), is significantly less effective than embodiments disclosed herein at reducing the amount of oxygen production resulting from interaction between the at least one multivalent component and the molten glass. Without wishing to be limited by theory, it is believed that under normal operating conditions, such compounds migrate away from the surface of the refractory block material during heat-up, thereby substantially minimizing their effectiveness at reducing the amount of oxygen production resulting from interaction between at least one multivalent component and the molten glass.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A method of making a glass sheet comprising
treating a refractory block material comprising at least one multivalent component with a vehicle comprising at least one redox altering component or precursor;
flowing molten glass over the refractory block material, wherein the treatment of the refractory block material with the vehicle comprising at least one redox altering component or precursor reduces the amount of oxygen production resulting from interaction between the at least one multivalent component and the molten glass, wherein the vehicle comprising at least one redox altering component or precursor comprises at least one alkaline earth compound;
and the at least one redox altering component or precursor is applied as a liquid and comprises at least 1 gram of redox altering component per every 100 milliliters of liquid.

2. The method of claim 1, wherein the refractory block material comprises at least one component material selected from the group consisting of zircon, alumina, titania, mullite, monazite, xenotime, spinel, zirconia, beta-alumina, and beta double prime-alumina.

3. The method of claim 1, wherein the refractory block material comprises zircon.

4. The method of claim 1, wherein the at least one alkaline earth compound is selected from the group consisting of alkaline earth carbonates, nitrates, nitrites, sulfates, hydrates, borates, oxides, fluorides, chlorides, bromides, iodides, sulfides, selenates, arsenates, antimonates, stannates, aluminates, phosphates, silicates, silicofluorides, thiocyanates, permanganates, perchlorates, and persulfates.

5. The method of claim 1, wherein the refractory block material comprises at least one grain boundary phase.

6. The method of claim 1, wherein the method comprises heating the treated refractory block material for at least 10 hours at a temperature of at least 1,000° C.

7. The method of claim 1, wherein the vehicle comprising at least one redox altering component or precursor is applied as a liquid in an amount of at least 50 microliters per square inch of surface space of the refractory block material.

8. The method of claim 1, wherein treating the refractory block material with a vehicle comprising at least one redox altering component or precursor comprises at least one application method selected from the group consisting of spraying, brushing, rolling, dipping, and immersing.

9. The method of claim 1, wherein the vehicle comprising the at least one redox altering component or precursor comprises a colloidal suspension that comprises at least one redox altering component.

10. The method of claim 1, wherein the vehicle comprising the at least one redox altering component or precursor comprises a sol that comprises at least one redox altering component and the treating step further comprises applying a pH modifying solution to precipitate the sol to a gel.

11. The method of claim 1 wherein the at least one redox altering component or precursor is selected from the group consisting of calcium chloride, magnesium chloride, strontium chloride, barium chloride, calcium carbonate, magnesium carbonate, strontium carbonate, barium carbonate, calcium oxide, magnesium oxide, strontium oxide, barium oxide, calcium nitrate, magnesium nitrate, strontium nitrate, barium nitrate, calcium sulfate, magnesium sulfate, strontium sulfate, and barium sulfate.

12. The method of claim 1, wherein the at least one multivalent component is iron oxide.

13. The method of claim 1, wherein the molten glass comprises an alkali oxide.

* * * * *